JONES & TYLER.
Seeding Machine.
No. 3,191. Reissued Nov. 10, 1868.
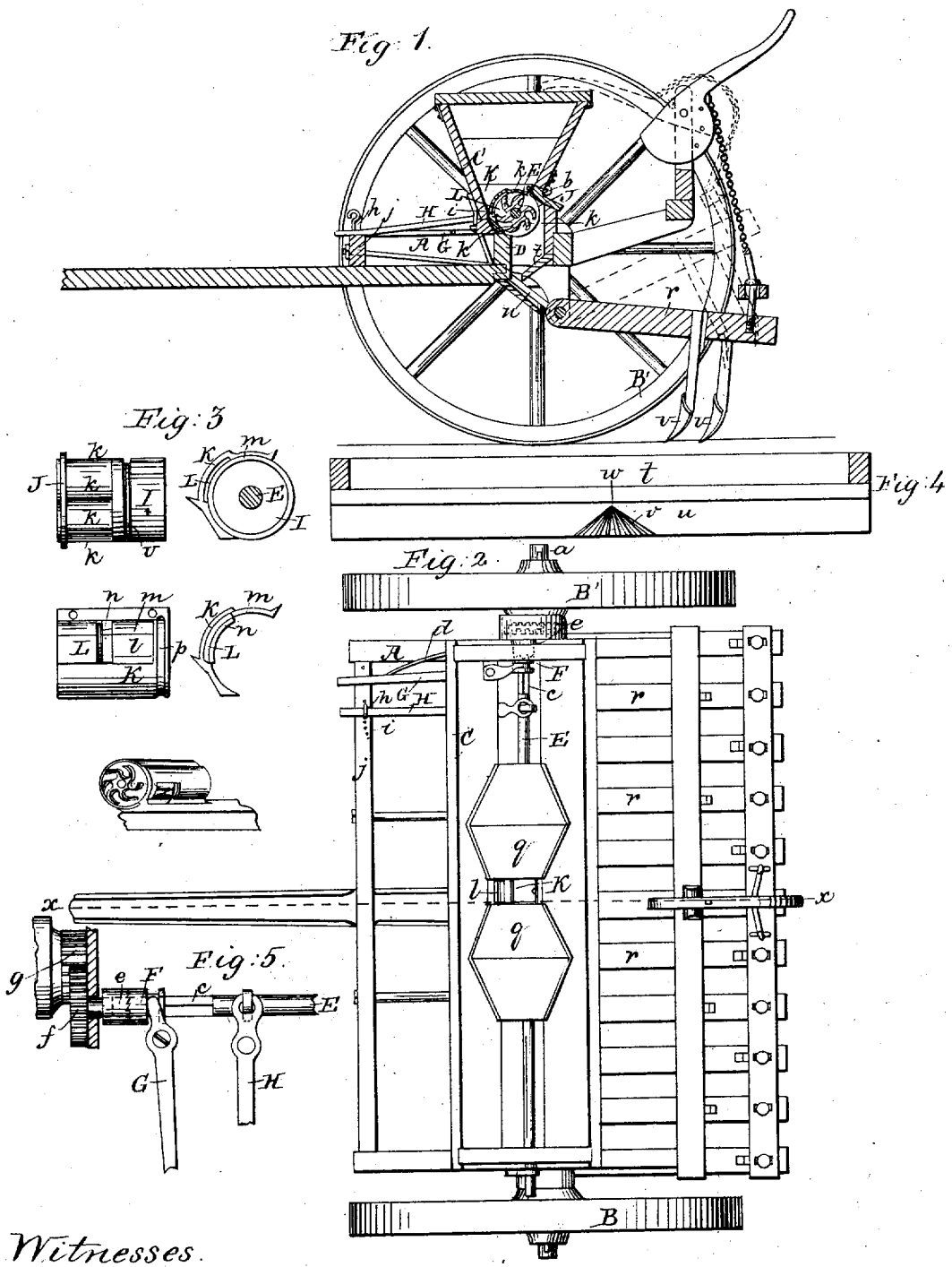
Witnesses.
J. W. Coombs
G. W. Reed
N. PETERS. Photo-Lithographer, Washington, D. C.

UNITED STATES PATENT OFFICE.

WILLIAM M. JONES AND D. W. HALL, OF HORICON, WISCONSIN, ASSIGNEES, BY MESNE ASSIGNMENTS, OF W. M. JONES AND S. E. TYLER.

IMPROVEMENT IN SEEDING-MACHINE.

Specification forming part of Letters Patent No. 36,159, dated August 12, 1862; Reissue No. 3,191, dated November 10, 1868.

*To all whom it may concern:*

Be it known that we, WILLIAM M. JONES and D. W. HALL, both of Horicon, Dodge county, in the State of Wisconsin, have, by deed of assignment duly recorded in the Patent Office, become the sole owners of a certain invention, entitled "An Improvement in Seeding-Machines," for which Letters Patent of the United States were granted to WILLIAM M. JONES and S. E. TYLER, August 12, 1862; and we hereby declare the following to be a full, clear, and exact description of the same, reference being had to the accompanying drawings, forming part of this specification.

In these drawings, Figure 1 represents a transverse vertical section of our seeding-machine, the line *x x*, Fig. 2, indicating the plane of section. Fig. 2 is a plan or top view of the same. Fig. 3 is an edge view of the seed-distributing cylinder and the semi-cylinder. Fig. 4 is a detached longitudinal section of the scattering-boards. Fig. 5 is a detached sectional view of the driving mechanism which operates the seed-distributing device. Fig. 6 is a detached view of the seed-distributing cylinder, with the semi-cylinder removed. Fig. 7 is a detached perspective view of the seed-distributing cylinder and semi-cylinder. Fig. 8 is a detached plan view of the inner or convex side of the semi-cylinder. Fig. 9 is an edge view of the semi-cylinder detached from the seed-distributing cylinder.

The same letters of reference indicate the same parts in the several figures.

This invention relates to a new and improved machine for sowing seed broadcast; and it consists in a novel and improved means for discharging the seed from the seed box or hopper, whereby the flow of seed may be graduated as desired, so as to sow a greater or less quantity on the same area, and the seed prevented from being broken or bruised in being discharged, and at the same time be scattered or sown in a perfect broadcast manner.

To enable those skilled in the art to make and use this invention, we will proceed to describe it, referring for that purpose to the above-mentioned drawings.

A represents a rectangular frame, which is mounted on two wheels, B B′, placed loosely on arms or axles *a a*. C is a seed box or hopper, which extends the whole width of the frame A, and is connected, at its back part, by hinges *b*, to a box, D, which is secured permanently to the frame A, and also extends its whole width, so that the seed-box C, when closed down upon it, will register therewith, the two forming one box, in which the seed-distributing mechanism is placed.

E is a shaft, which runs longitudinally through the box D, and is allowed to slide in its bearings in a longitudinal direction. This shaft is provided, near one end, with a square, *c*, on which a clutch, F, is fitted, said clutch being furnished with ratchet-teeth at one side. This clutch has a lever, G, connected with it, against which a spring, *d*, bears, the spring having a tendency to keep the clutch engaged with the ratchet-teeth on a collar or sleeve, *e*, which is placed loosely on the shaft E. A pinion, *f*, attached to said sleeve, gears into teeth *g* on the hub of the wheel B′.

N is a hub-plate, furnishing bearings for the axle of the wheel B′ and the sleeve-pinion F. It is semicircular in shape, and extends above the pinion, forming a covering, as shown in Fig. 2, for the same, to protect it from being clogged by the dirt falling from the wheel B′ as the latter moves over the ground.

When the clutch F is engaged with the collar *e*, the shaft E will be rotated from the wheel B′ as the machine is drawn along, and said shaft may be rendered inoperative at any time, or prevented from rotating, by throwing the clutch F out of gear with the sleeve *e*, as will be fully understood by referring to Fig. 5.

H is a lever, which is connected to the shaft E, for the purpose of moving it in a longitudinal direction. The outer part of this lever projects over the front part of the frame A, and may be secured at any desired point by a pin, *h*, which passes through it and into any one of a series of holes, *i*, made in the front cross-bar, *j*, of the frame A.

The object of thus adjusting or moving the shaft E will be presently explained.

On the shaft E there is placed and permanently attached a cylinder, I, which has a series of buckets, *k*, attached to it. These buckets extend outward to the periphery of the cylinder I, and on the buckets there is fitted a head, J, which is formed of a circular plate, or discharging-slots made in it, corresponding to the shape of the buckets, and a central hole to allow the buckets and shaft to pass through it, the head fitting snugly to the buckets and shaft, but the latter being at the same time allowed to slide freely through it. By these means a series of seed-cells is formed between the head J, the end of the cylinder I, and two adjoining buckets; and by imparting to the shaft a longitudinal motion the size of these seed-cells can be increased or decreased at pleasure. In order to effect this purpose without crushing or bruising the seed it is essential to have the disk so arranged that no portion offers a place to the seed to rest upon, and that it passes into the cells and out of them without the liability of crushing the seed.

K represents a curved plate, of semi-cylindrical form, which covers the upper part of the cylinder I and buckets *k*. The semi-cylinder is secured to the upper part of the box D, and it has a square opening, *l*, made in it, as clearly shown in Figs. 7 and 8. The inner surface of the semi-cylinder K is not uniform, a longitudinal groove or recess, *m*, being made in it to receive a curved plate, L, which may be termed a "gate," and which is allowed to slide in the semi-cylinder. This gate is provided with a ledge, *n*, at its inner side, which fits in a groove, *o*, made circumferentially in the cylinder I, and thereby causes the gate to be connected to said cylinder, so as to move longitudinally with it.

The head J is not allowed to slide or move with the shaft E, but rotates with it. It is prevented from sliding with the shaft E in consequence of having its periphery fitted in a groove, *p*, in the inner surface of the semi-cylinder K, near one end of it.

When the gate L is fitted in the semi-cylinder K the inner surface of the latter and gate form a curved surface concentric with the cylinder I and buckets *k*, as clearly shown in Figs. 1, 3, and 9. Its edge is flush with the edge $k^{\times}$ of the solid part of the cylinder, (see Fig. 6,) and if said cylinder is moved toward the head J the gate moves with it. Without the gate, if the cylinder is moved toward the stationary head, the solid part of the same gradually comes opposite the opening *l* and moves in the seed, and the seed is liable to get bruised. By the use of the gate that portion of the solid part of the cylinder which otherwise would move in the grain is covered, and nothing moves in the grain except the edge of the buckets, and that portion of the buckets opposite the opening will readily fill with grain or corn without any danger of bruising the same. The semi-cylinder K is provided with a chambered recess, *m*, above the opening *l*, where the edges of the buckets pass under, so as to leave a certain space between the working portion of the circumference of the buckets and the inner surface of the semi-cylindrical plate K. By this space the seed which is carried up by the buckets is prevented from being crushed.

In the bottom of the seed-box C there are placed double inclined planes *q q*, which form a bottom for the same, and cause the seed to be presented or conducted to the opening *l* in the semi-cylinder K, as will be seen by referring to Fig. 2, a space being allowed between the ends of the inclined planes for the seed to drop into the opening.

To the frame A there is attached a series of frames, *r*, provided with narrow teeth *s*, for covering the seed. Any proper seed-covering device may be employed; and it will be understood that, although only one seed-distributing device is shown and described, a series of them is used, placed side by side.

The lower part of the box D is inclined, as shown at *t* in Fig. 1, and immediately below this inclined portion there is placed another inclined board, *u*, the latter being inclined in a reverse position to the former, and so placed in relation to it that it will receive the seed therefrom.

The inclined board *u* has its upper surface or face side provided with a series of grooves, *v*, which radiate from centers *w* at its upper edge, and which are at points in line with the buckets *k*.

The operation is as follows: As the machine is drawn along the shaft E is rotated from the wheel B′—that is, if the clutch F is in gear with the collar *e* of pinion *f*—and the seed in the seed-box C passes through the opening *l* in the semi-cylinder K, and the buckets *k*, which rotate with the shaft E, catch the seed and carry the same upward within the semi-cylinder K, and discharge it, as they pass over behind the shaft, on the inclined bottom *t*, and thence on the inclined board *u*, from which it falls upon the ground in a scattered or broadcast state.

The head J, it will be seen, serves as a partition at one end of the buckets, while the solid portion of the cylinder I serves as a partition at the opposite end, and the quantity of seed discharged may be regulated, as desired, by shifting or moving the shaft E in a longitudinal direction, so that the gate L, which moves with the cylinder I, may cover more or less of the opening *l* in the semi-cylinder K. The gate L covers the solid part of the cylinder, and when the latter rotates said gate remains stationary, being confined in the longitudinal recess *m*. The seed, therefore, is not allowed to come in contact with the solid part of the cylinder, and the edges of the buckets alone pass through the seed. By this arrangement, and by the use of the chambered recess *n′* above the opening *l*, the seed is prevented from becoming bruised or crushed, and a uniform discharge is secured.

The foregoing being a full description of our seeding-machine as improved by the inventors, WILLIAM M. JONES and S. E. TYLER, what we claim in this application, and desire to secure by Letters Patent, as sole assignees of the inventors aforesaid, is—

1. The cylinder I, with buckets *k* attached, secured to a rotating and sliding or longitudinally-adjustable shaft, E, in connection with the head J and semi-cylinder K, provided with an opening, *l*, all being arranged within a suitable box, D, and in such relation to a seed box or hopper, C, as to operate in the manner and for the purpose substantially as described.

2. The curved plate or gate L, placed or fitted within the semi-cylinder K, connected to the cylinder I, and arranged in relation with the opening *l* of said semi-cylinder K and the buckets *k*, to operate substantially as and for the purpose specified.

3. The arrangement of the clutch F, collar *e*, pinion *f*, and shaft E, substantially as shown and described, for the combined purpose of permitting said shaft to be thrown in and out of gear with the wheel B′, and also permitting said shaft to be adjusted longitudinally when desired.

4. The combination and arrangement of the cylinder I with buckets *k*, arranged to traverse through the disk or head J, for the purpose of increasing or diminishing the rate of feeding or the length of the buckets, substantially as described.

5. The collar *e* and pinion *f*, arranged in relation to the hub-plate N and clutch F, substantially as and for the purpose specified.

WM. M. JONES.
D. W. HALL.

Witnesses:
GEO. F. RANDALL,
J. LYNN MILLIGAN.